United States Patent Office 3,014,929
Patented Dec. 26, 1961

3,014,929
METHOD OF MAKING CARVOMENTHENE OXIDE
Frank P. Greenspan, Larchmont, and Seymour M. Linder, Eggertsville, N.Y., assignors to FMC Corporation, a corporation of Delaware
No Drawing. Filed May 19, 1958, Ser. No. 735,980
1 Claim. (Cl. 260—348)

This invention relates to a new organic compound, and to a new and novel method of preparing it. More particularly, this invention relates to carvomenthene oxide and to its preparation by the hydrogenation of limonene monoxide.

Carvomenthene oxide is useful as a reactive diluent for epoxy resins. Further, it has advantages as an intermediate in the preparation of other chemicals, and is more reactive than its precursor limonene monoxide. This material is particularly desirable, in view of its derivation from low cost limonene, which is available in large quantities commercially.

In its use as a reactive diluent for epoxy resins having terminal oxirane oxygen groups, the carvomenthene oxide is employed as a solvent in application of the resin. The solution of resin in the oxide has a viscosity much lower than that of the original epoxy resin, with the result that the compound may readily be cast, used as a coating, or otherwise applied. When the epoxy resin subsequent to application is cured with a polyfunctional active hydrogen containing reagent such as a polyamine or a polybasic acid or anhydride, the carvomenthene oxide, being highly reactive with the curing agent and with the epoxy resin, is made a part of the cured resinous product, and therefore it is not normally extractile.

According to the present process carvomenthene oxide is produced by hydrogenation of limonene monoxide in the presence of finely divided, platinum-containing catalyst.

Carvomenthene oxide and its preparation herein from limonene monoxide may be illustrated by the following structural formulae:

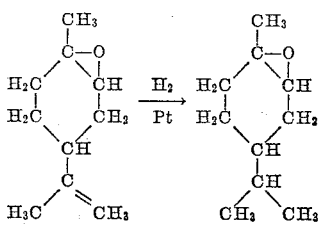

It is surprising that the limonene monoxide can be converted to carvomenthene oxide, a reaction which involves hydrogenation of ethylenic unsaturation in the limonene monoxide molecule, without substantial reduction in its epoxy, otherwise oxirane, oxygen content. When the hydrogenation reaction is conducted in the presence of Raney nickel as a hydrogenation catalyst, the hydrogenation proceeds essentially to completion, with the formation of the saturated alcohol, that is by ring opening of the oxirane ring as well as hydrogenation of the ethylenic unsaturation. It is well known that in many reactions the Raney nickel catalyst is less active than the noble metal catalysts, such as platinum. For this reason it would be expected that the platinum-containing catalyst would be even more destructive of oxirane oxygen than would the Raney nickel catalyst.

The limonene oxide employed in the preparation of carvomenthene oxide according to the present process may be produced by reaction of limonene (1,8-p-menthadiene), the dl form of which is sometimes called dipentene, with peracetic acid. This epoxidation can be conducted with other peracids, for example the other lower aliphatic peracids or perbenzoic acid under well known epoxidation conditions which have been applied to many ethylenically unsaturated compounds.

The following examples are included only by way of illustration of the present invention, and are not to be deemed limitative thereof.

EXAMPLE 1

Preparation of limonene monoxide

Five hundred grams of d-limonene was dissolved in 2250 ml. of chloroform. Seven and one half grams of anhydrous sodium acetate dissolved in 520 g. of a 40% solution of peracetic acid was added slowly with stirring to the d-limonene solution. An exothermic reaction occurred, and the temperature of the above reaction mixture was maintained at between 25° and 30° C. by cooling in a Dry Ice-acetone bath. The reaction mixture was stirred for 15 minutes following introduction of all the sodium acetate-peracetic acid solution. Following this the water layer was separated from the chloroform layer and the latter was washed with water, sodium bicarbonate solution, and again with water, and was dried over an anhydrous magnesium sulfate to separate and purify the d-limonene monoxide resulting from the above reaction. The product of reaction was a liquid which boiled at 74° to 75.5° C./9.5 mm. and upon analysis showed 9.5% oxirane oxygen and a bromine number of 125.

EXAMPLE 2

Preparation of carvomenthene oxide employing platinum as a catalyst

A. A mixture of 25 g. of the limonene monoxide prepared according to Example 1 above was dissolved in 25 ml. of methanol and 250 mg. of platinum oxide having a particle size of about 2 microns was dispersed in the solution. The resulting reaction mixture was then placed in a Parr apparatus where it was subjected to the action of an atmosphere of hydrogen gas maintained at 60 pounds pressure, to effect hydrogenation of the limonene monoxide.

The hydrogenation was completed in 30 minutes at 25° C., with the theoretical amount of hydrogen, namely 1 mole per mole of limonene monoxide, being absorbed. Continued heating of the reaction mixture for one hour more caused no further uptake of hydrogen beyond the indicated theoretical amount. On removal of the platinum and methanol, the carvomenthene oxide product was dried and obtained in the amount of 24 g., essentially a quantitative yield. The product was dried and found to have an index refraction, $N_D^{25}$ of 1.4536 and a density at 25° C. of 0.913. It contained 9.3% of epoxy oxygen and had a bromine number of 8.6.

B. Ten grams of a hydrogenation catalyst comprising $Al_2O_3$ having deposited on it 5% by weight of platinum, was dispersed with agitation in 100 g. of limonene oxide prepared according to the method of Example 1 above and containing 9.2% oxirane oxygen. The catalyst employed had a particle size of about 50 microns. The resulting dispersion then was placed in a one liter autoclave, where it was subjected to the action of hydrogen gas maintained at about 200 pounds pressure, at about 40° C., to effect hydrogenation of the limonene monoxide. The hydrogenation was completed in 1 hour, with one mole of hydrogen per mole of limonene monoxide being absorbed. Further heating of the reaction mixture for an additional hour caused no further uptake of hydrogen.

On removal of the platinum catalyst from the reaction mixture, the carvomenthene oxide product was dried and obtained in the amount of 95 g. essentially a quantitative yield. The product was dried and found to have an index of refraction, $N_D^{25}$ of 1.4536, and a density at 25° C. of 0.913. It contained about 9.1% of epoxy oxygen and had a bromine number of 10.

EXAMPLE 3

*Reaction of limonene monoxide with hydrogen in the presence of raney nickel as a catalyst*

A solution of 20 g. of limonene monoxide prepared according to the procedure of Example 1 above, and containing 9.2% oxirane oxygen was dissolved in 20 g. of methanol. Twelve milliliters of a settled suspension of Raney nickel in methanol, prepared according to the method of U.S. Patent No. 1,839,974 (1932), to Raney, was added to the resulting solution which then was hydrogenated in a Parr apparatus at 60 pounds hydrogen gas pressure. The hydrogenation was run for 1½ hours at about 40° C. with a resulting absorption by the reaction mixture of two moles of hydrogen per mole of the limonene monoxide.

On removal of the Raney nickel catalyst and the methanol, the product of reaction was isolated in the amount of 15 g. This product was identified as the saturated alcohol derivative, having an oxirane oxygen content of 0.4%, a hydroxyl content of 10.0%, and a bromine number of 3.9. Thus it will be seen that essentially all of the epoxy oxygen present in the limonene monoxide was ring opened during the hydrogenation operation employing Raney nickel as a catalyst.

The hydrogenation reaction whereby limonene monoxide is converted to carvomenthene oxide according to the present process may be carried out conveniently in a Parr hydrogenation apparatus, although any gas-tight pressure vessel may be employed. The reaction suitably is conducted at about 25 to 45° C., and at a hydrogen gas pressure of about 1 to 15 atmospheres. Under these conditions, and in the presence of finely divided platinum as a hydrogenation catalyst, the stoichiometric amount of hydrogen, namely one mole per mole of limonene monoxide, will be taken up by the limonene monoxide in about 20 minutes to 2 hours. The reaction may be carried out in the presence or absence, as desired, of an inert organic solvent, for example methanol, ethanol, or isopropanol.

The finely divided, platinum-containing catalyst employed herein may be any of the well-known platinum-containing hydrogenation catalysts, for example platinum or platinum oxide, or platinum or platinum oxide deposited on an inert carrier such as calcium carbonate or aluminum oxide. When a carrier is employed, the catalyst, comprising the carrier carrying a coating of platinum or platinum oxide, suitably may be prepared by dissolving platinum chloride in water, dispersing the carrier in the solution, and reducing the platinum chloride to platinum for example with hydrogen gas or formaldehyde. This causes deposition of platinum on the carrier. Such a catalyst normally contains about 0.1 to 10% of platinum on the carrier.

The present reaction to form carvomenthene oxide can be carried out by common hydrogenation techniques, for example either employing a so called fixed bed of catalyst, in which the catalyst is fixed and the hydrogenation reaction mixture passed through it, or employing a so-called fluidized dispersion of the catalyst in the reaction mixture. The size of catalyst particles employed will vary depending on which method is used, for example with fixed bed operation the catalyst particles will have sizes of about 60 mesh to ⅛" pellets. On the other hand when the fluidized bed system is employed, a more finely divided catalyst will be employed to permit ready fluidization or dispersion of it in the reaction mixture, for example the particles will have a size range of about 60 mesh down to several microns. About 250 mg. to 10 g. of platinum catalyst per 100 g. of limonene monoxide will be employed in fluid bed operation. In the case fixed bed the amount of catalyst, as is well known, will depend on the amount of recirculation of the reaction mixture through the catalyst bed. It is to be understood, however, that the particular mode of operation with the platinum catalyst is not critical to the present process, it being important only that the hydrogenation of limonene monoxide be conducted in the presence of a platinum-containing catalyst, by techniques commonly used heretofore in the hydrogenation of other materials.

In order to demonstrate the usefulness of carvomenthene oxide as a diluent in the preparation of epoxy resinous products, a solution was prepared of 2.5 g. of carvomenthene oxide (10 parts per 100) in 25 g. of a low molecular weight condensation polymer of epichlorohydrin and bisphenol-A normally used in preparation of adhesives, castings, laminates, and pottings. This solution had a viscosity of 3.45 cps. at 25° C. as compared with the viscosity of the undiluted polymer, which was about 18,685 cps. at 25° C. The solution was mixed 2.65 g. of diethylene triamine (10.6 parts per 100), a curing agent for the polymer, and was kept for 20 hours at 23 to 27° C. after which it was heated for 2 hours at 100° C. The heating of the polymer was conducted in an aluminum mold having dimensions of ½" x ½" x 5". The cured product had a Barcol hardness of 80 and a heat distortion (ASTM D-648, 264 p.s.i.) temperature of 80° C.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claim, the invention may be practiced by those skilled in the art, and having the benefit of this disclosure, otherwise than as specifically described and exemplified herein.

What is claimed is:

Method of preparing carvomenthene oxide, comprising reacting limonene monoxide with hydrogen at a hydrogen pressure of 1 to 15 atmospheres and at temperature about 25 to 45° C. in the presence of an inert solvent, said reaction being conducted in the presence of a platinum-containing catalyst for a period of about 20 minutes to 2 hours, until one mole of hydrogen per mole of limonene monoxide had been reacted with said limonene monoxide.

References Cited in the file of this patent

UNITED STATES PATENTS 1,967,433    Schoeller _____ July 24, 1934

FOREIGN PATENTS 378,759    Great Britain _____ Aug. 18, 1932

OTHER REFERENCES

Borgwardt et al.: J.A.C.S., vol. 56, 1934, pages 1185–87.

Blumann: J. Chem. Soc., 1949, 2040–2043.

Simonsen: The Terpenes, vol. I, 1953, pages 317, 341.

Pigulevski et al.: Chem. Abst., vol. 51, pp. 16357–16359 (1957).

UNITED STATES PATENT OFFICE

CERTIFICATE OF CORRECTION

Patent No. 3,014,929                            December 26, 1961

Frank P. Greenspan et al.

It is hereby certified that error appears in the above numbered patent requiring correction and that the said Letters Patent should read as corrected below.

Column 1, line 34, for "extractile" read -- extractible --; column 2, line 45, for "pole" read -- mole --; column 4, line 6, after "case" insert -- of --; line 25, after "mixed" insert -- with --.

Signed and sealed this 8th day of May 1962.

(SEAL)
Attest:

ERNEST W. SWIDER                            DAVID L. LADD
Attesting Officer                              Commissioner of Patents